US012574437B2

(12) United States Patent
Tornow et al.

(10) Patent No.: US 12,574,437 B2
(45) Date of Patent: *Mar. 10, 2026

(54) REUSE OF EXECUTION ENVIRONMENTS WHILE GUARANTEEING ISOLATION IN SERVERLESS COMPUTING

(71) Applicant: Cisco Technology, Inc., San Jose, CA (US)

(72) Inventors: Dominik Rene Tornow, San Jose, CA (US); Urmil Vijay Dave, San Jose, CA (US); Kyle Andrew Donald Mestery, Woodbury, MN (US); Ian Wells, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 152 days.

This patent is subject to a terminal disclaimer.

(21) Appl. No.: 18/529,802

(22) Filed: Dec. 5, 2023

(65) Prior Publication Data

US 2024/0121300 A1 Apr. 11, 2024

Related U.S. Application Data

(63) Continuation of application No. 18/148,276, filed on Dec. 29, 2022, now Pat. No. 11,882,184, which is a
(Continued)

(51) Int. Cl.
*H04L 67/1097* (2022.01)

(52) U.S. Cl.
CPC .................... *H04L 67/1097* (2013.01); *G05B 2219/23428* (2013.01); *G05B 2219/34299* (2013.01)

(58) Field of Classification Search
CPC ...... H04L 67/1097; G05B 2219/23428; G05B 2219/34299
See application file for complete search history.

(56) References Cited

U.S. PATENT DOCUMENTS

| | | | | |
|---|---|---|---|---|
| 8,024,427 B2 * | 9/2011 | Lawrence | ............. | G06F 16/957 |
| | | | | 707/972 |
| 8,239,836 B1 * | 8/2012 | Franz | ...................... | G06F 21/52 |
| | | | | 717/127 |

(Continued)

FOREIGN PATENT DOCUMENTS

| | | | | | |
|---|---|---|---|---|---|
| CN | 103339600 A | * | 10/2013 | ............. | G06F 9/452 |
| CN | 107209726 A | * | 9/2017 | ......... | G06F 16/1815 |

(Continued)

*Primary Examiner* — Shean Tokuta
(74) *Attorney, Agent, or Firm* — Polsinelli P.C.

(57) ABSTRACT

Systems, methods, and computer-readable media are provided for reusing execution environments and code of serverless functions while ensuring isolation in serverless computing environments. In some examples, a method can include, in response to a first request to run a serverless function, executing, at an execution environment on a network, computer-readable code configured to perform the serverless function; after the computer-readable code has executed, modifying a pointer to an area of memory used to store a first state of the serverless function to reference a different area of memory; in response to a second request to run the serverless function, reusing, at the execution environment, the computer-readable code to perform the serverless function; and based on the pointer referencing the different area of memory, using the different area of memory to store a second state of the serverless function.

20 Claims, 7 Drawing Sheets

Related U.S. Application Data continuation of application No. 17/660,371, filed on Apr. 22, 2022, now Pat. No. 11,558,462, which is a continuation of application No. 17/329,327, filed on May 25, 2021, now Pat. No. 11,323,516, which is a continuation of application No. 16/953,007, filed on Nov. 19, 2020, now Pat. No. 11,070,621.

(60) Provisional application No. 63/054,538, filed on Jul. 21, 2020.

(56) References Cited

U.S. PATENT DOCUMENTS

| | | | | |
|---|---|---|---|---|
| 8,495,601 | B2 * | 7/2013 | Lincer | B60L 3/12 |
| | | | | 717/148 |
| 9,208,081 | B1 * | 12/2015 | Dice | G06F 12/0269 |
| 9,223,611 | B2 * | 12/2015 | Kekeh | G06F 9/4856 |
| 9,864,759 | B2 * | 1/2018 | Bihani | G06F 15/17318 |
| 9,946,514 | B1 * | 4/2018 | Kostello | G06F 11/3698 |
| 10,310,992 | B1 * | 6/2019 | Badishi | G06F 12/1458 |
| 10,318,347 | B1 * | 6/2019 | Wagner | G06F 9/5077 |
| 11,070,621 | B1 * | 7/2021 | Tornow | H04L 67/1097 |
| 11,266,911 | B1 * | 3/2022 | Tran | A63F 13/73 |
| 11,323,516 | B2 * | 5/2022 | Tornow | H04L 67/1097 |
| 11,368,515 | B1 * | 6/2022 | Bruns | H04L 67/1097 |
| 2004/0093459 | A1 * | 5/2004 | Shimizu | G06F 12/0638 |
| | | | | 711/E12.083 |
| 2010/0229100 | A1 * | 9/2010 | Miller | G06F 16/955 |
| | | | | 715/745 |
| 2010/0275004 | A1 * | 10/2010 | Hsu | G06F 3/04886 |
| | | | | 713/2 |
| 2011/0271086 | A1 * | 11/2011 | Ransom | G06F 9/4411 |
| | | | | 710/10 |
| 2012/0167117 | A1 * | 6/2012 | Kekeh | G06F 9/48 |
| | | | | 719/318 |
| 2012/0216276 | A1 * | 8/2012 | Regnault | G06Q 20/3574 |
| | | | | 726/16 |
| 2012/0233590 | A1 * | 9/2012 | Ranganathan | G06F 8/30 |
| | | | | 717/106 |
| 2012/0303476 | A1 * | 11/2012 | Krzyzanowski | G06F 16/00 |
| | | | | 705/26.61 |
| 2014/0285500 | A1 * | 9/2014 | Lindholm | G06T 1/20 |
| | | | | 345/506 |
| 2015/0089495 | A1 * | 3/2015 | Persson | G06F 9/45558 |
| | | | | 718/1 |
| 2015/0153963 | A1 * | 6/2015 | Curewitz | G06F 9/3885 |
| 2015/0268974 | A1 * | 9/2015 | Goebel | G06F 9/44552 |
| | | | | 701/1 |
| 2015/0302547 | A1 * | 10/2015 | Hwang | G06F 3/0604 |
| | | | | 345/531 |
| 2016/0077672 | A1 * | 3/2016 | Anderson | G06F 40/103 |
| | | | | 715/234 |
| 2016/0147619 | A1 | 5/2016 | Borthakur et al. | |
| 2018/0052776 | A1 * | 2/2018 | Zhao | G06F 12/109 |
| 2018/0101403 | A1 | 4/2018 | Baldini Soares et al. | |
| 2018/0121108 | A1 * | 5/2018 | Dain | G06F 3/0619 |
| 2018/0196867 | A1 | 7/2018 | Wiesmaier et al. | |
| 2018/0314515 | A1 * | 11/2018 | de Kruijf | G06F 8/656 |
| 2019/0102206 | A1 * | 4/2019 | Fichtenholtz | G06F 9/44505 |
| 2019/0107965 | A1 | 4/2019 | Deval et al. | |
| 2019/0121777 | A1 * | 4/2019 | Knowles | G06F 15/17325 |
| 2019/0146832 | A1 | 5/2019 | Gschwind et al. | |
| 2019/0149480 | A1 | 5/2019 | Arjun et al. | |
| 2020/0004953 | A1 | 1/2020 | Lemay et al. | |
| 2020/0012585 | A1 * | 1/2020 | Levit-Gurevich | |
| | | | | G06F 11/3636 |
| 2020/0073739 | A1 | 3/2020 | Rungta et al. | |
| 2020/0081745 | A1 | 3/2020 | Cybulski et al. | |
| 2020/0104378 | A1 | 4/2020 | Wagner et al. | |
| 2020/0117470 | A1 | 4/2020 | Vaikar | |
| 2020/0125501 | A1 | 4/2020 | Durham et al. | |
| 2020/0127980 | A1 | 4/2020 | Smith et al. | |
| 2020/0201618 | A1 | 6/2020 | Graham | |
| 2020/0204618 | A1 * | 6/2020 | Agarwal | G06F 16/955 |
| 2020/0213279 | A1 | 7/2020 | Xiong et al. | |
| 2020/0226009 | A1 * | 7/2020 | Bachmutsky | G06F 9/5038 |
| 2020/0311054 | A1 | 10/2020 | Hicks et al. | |
| 2020/0356406 | A1 | 11/2020 | Mohan et al. | |
| 2021/0042098 | A1 | 2/2021 | Madisetti et al. | |
| 2021/0089447 | A1 * | 3/2021 | Jin | G06F 1/263 |
| 2021/0240638 | A1 * | 8/2021 | Deutsch | G06F 12/1408 |
| 2021/0263779 | A1 * | 8/2021 | Haghighat | G06F 11/3495 |
| 2021/0377248 | A1 * | 12/2021 | Brainer | H04L 63/083 |
| 2022/0030065 | A1 * | 1/2022 | Tornow | H04L 67/34 |
| 2022/0179786 | A1 * | 6/2022 | Jin | G06F 12/0684 |
| 2022/0247819 | A1 * | 8/2022 | Tornow | H04L 67/34 |
| 2024/0121300 | A1 * | 4/2024 | Tornow | H04L 67/34 |

FOREIGN PATENT DOCUMENTS

| | | | | | |
|---|---|---|---|---|---|
| EP | 2713296 | A1 * | 4/2014 | | H04N 21/25875 |
| EP | 2863312 | A1 * | 4/2015 | | G06F 12/023 |
| JP | 2018206233 | A * | 12/2018 | | |
| JP | 2020022900 | A * | 2/2020 | | |
| KR | 20080012664 | A * | 2/2008 | | G06F 12/0276 |
| WO | WO-2011054498 | A1 * | 5/2011 | | G06K 19/073 |
| WO | WO-2012064870 | A2 * | 5/2012 | | G06F 8/64 |
| WO | WO-2014145704 | A1 * | 9/2014 | | H04L 12/2816 |
| WO | WO-2016051243 | A1 * | 4/2016 | | G06F 3/067 |
| WO | WO-2016181200 | A1 * | 11/2016 | | G06F 9/544 |
| WO | WO-2017001900 | A1 * | 1/2017 | | G06F 9/544 |
| WO | WO-2018134061 | A1 * | 7/2018 | | G05B 19/042 |
| WO | 2020096639 | A1 | 5/2020 | | |

* cited by examiner

State of Function A

Pointer 330 → Memory Location 308

Swap

Memory Location 306

Client 340B

320 — Request     Response — 326

Client 340A

312 — Request     Response — 318

Execution Environment 212

Executor 302

322 — Execute     Execute — 314     State — 324     State — 316

Code (Function A) 204

Memory Location 306

Memory Location 308

Memory Location 310

Memory 304

Node 106

400

402 — RECEIVE REQUEST TO RUN A SERVERLESS FUNCTION

406 — INSTANTIATE EXECUTION ENVIRONMENT WITH FUNCTION

NO

FUNCTION CODE LOADED AT AN AVAILABLE EXECUTION ENVIRONMENT? — 404

YES

SWAP MEMORY LOCATION — 408

PROCESS REQUEST — 410

PROVIDE A RESPONSE TO THE REQUEST — 412

414 — SWAP MEMORY LOCATION

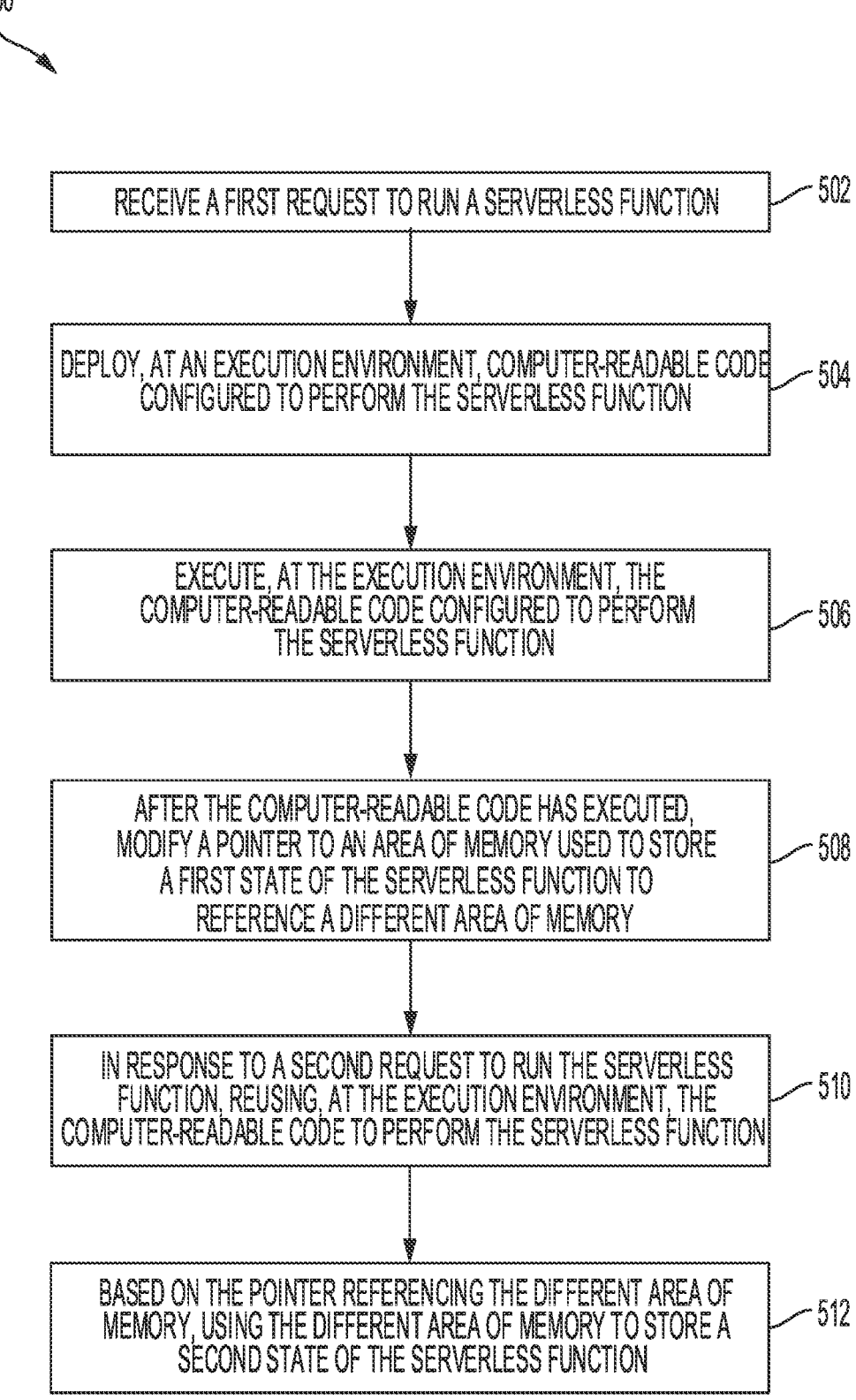

500

RECEIVE A FIRST REQUEST TO RUN A SERVERLESS FUNCTION — 502

DEPLOY, AT AN EXECUTION ENVIRONMENT, COMPUTER-READABLE CODE CONFIGURED TO PERFORM THE SERVERLESS FUNCTION — 504

EXECUTE, AT THE EXECUTION ENVIRONMENT, THE COMPUTER-READABLE CODE CONFIGURED TO PERFORM THE SERVERLESS FUNCTION — 506

AFTER THE COMPUTER-READABLE CODE HAS EXECUTED, MODIFY A POINTER TO AN AREA OF MEMORY USED TO STORE A FIRST STATE OF THE SERVERLESS FUNCTION TO REFERENCE A DIFFERENT AREA OF MEMORY — 508

IN RESPONSE TO A SECOND REQUEST TO RUN THE SERVERLESS FUNCTION, REUSING, AT THE EXECUTION ENVIRONMENT, THE COMPUTER-READABLE CODE TO PERFORM THE SERVERLESS FUNCTION — 510

BASED ON THE POINTER REFERENCING THE DIFFERENT AREA OF MEMORY, USING THE DIFFERENT AREA OF MEMORY TO STORE A SECOND STATE OF THE SERVERLESS FUNCTION — 512

FIG. 5

REUSE OF EXECUTION ENVIRONMENTS WHILE GUARANTEEING ISOLATION IN SERVERLESS COMPUTING

CROSS-REFERENCE TO RELATED APPLICATIONS

This application is a continuation of U.S. application Ser. No. 18/148,276, filed on Dec. 29, 2022, which in turn, is a continuation of U.S. application Ser. No. 17/660,371, filed on Apr. 22, 2022, now U.S. Pat. No. 11,558,462 granted Jan. 17, 2023, which in turn, is a continuation of U.S. application Ser. No. 17/329,327, filed on May 25, 2021, now U.S. Pat. No. 11,323,516 granted Apr. 13, 2022, which in turn, is a continuation of U.S. application Ser. No. 16/953,007, filed on Nov. 19, 2020, now U.S. Pat. No. 11,070,621 granted Jul. 20, 2021, which in turn, claims the benefit of, and priority to, U.S. Provisional Patent Application No. 63/054,538, filed on Jul. 21, 2020, the entire contents of which are expressly incorporated herein in their entirety and for all purposes

TECHNICAL FIELD

The present technology pertains to serverless computing and, more specifically, enabling reuse of execution environments while providing isolation in serverless computing.

BACKGROUND

Cloud computing aggregates physical and virtual compute, storage, and network resources in the "cloud", and allows users to utilize the aggregated resources. Typically, cloud providers manage the infrastructure and resources, thus relieving this burden from users. Developers can use cloud resources to deploy applications without the burden of managing the infrastructure and resources used by the applications. For example, serverless computing provides a computing execution model that allows developers to build applications and outsource infrastructure and resource allocation and management responsibilities to the cloud provider. The underlying infrastructure used to run the developers' applications is hosted and managed by the cloud provider.

In function-as-a-service (FaaS) implementations, serverless computing is provided as a service for running code for a client. The client can use cloud resources to run code and pay the cloud provider based on the compute time consumed by the code. FaaS can greatly simplify application deployment for developers. For example, a developer can upload the code to the cloud, and the cloud manages the resources for running the code. The cloud executes the code in response to any event configured to trigger the code. When an event configured to trigger the code occurs, the cloud provider can allocate resources for executing the code. To provide isolation and increase stability, the cloud provider can provision cloud resources for the code on demand. However, this on-demand approach comes with a performance penalty, as response times and latencies are negatively impacted by delays in provisioning and allocating resources for executing the code.

BRIEF DESCRIPTION OF THE DRAWINGS

In order to describe the manner in which the various advantages and features of the disclosure can be obtained, a more detailed description will be rendered by reference to specific embodiments which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIGS. 4 and 5 are flowcharts illustrating example methods for reusing execution environments and serverless functions while ensuring isolation in serverless computing environments, in accordance with some examples;

DESCRIPTION OF EXAMPLE EMBODIMENTS

Figure 1:
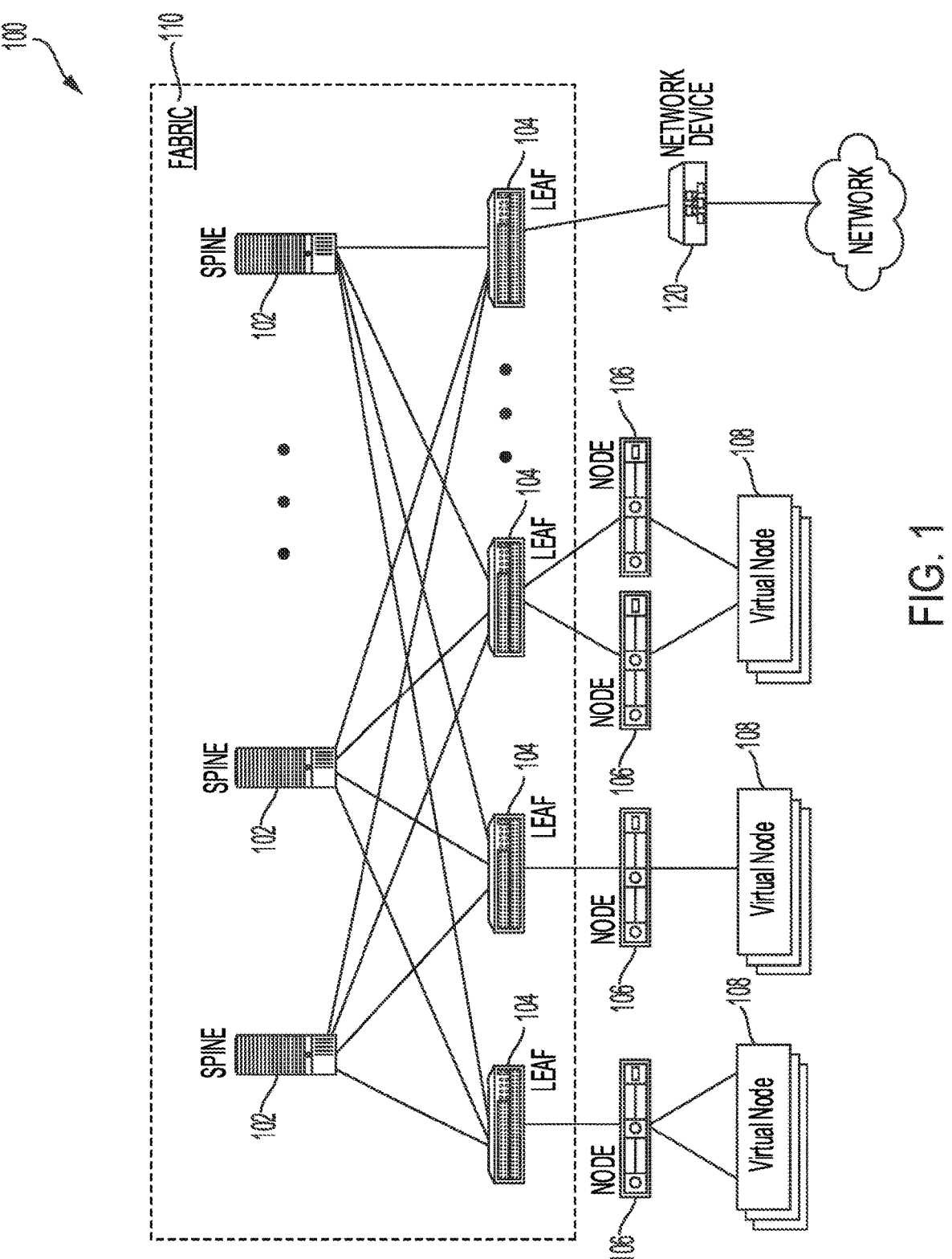
FIG. 1 is a block diagram illustrating an example network architecture, in accordance with some examples.

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

Overview

Disclosed herein are systems, methods, and computer-readable media for enabling reuse of execution environments while providing isolation in serverless computing environments. According to at least one example, a method for enabling reuse of execution environments and code for serverless functions while providing isolation in serverless computing environments is provided. The method can include, in response to a first request to run a serverless function, executing, at an execution environment on a network, computer-readable code configured to perform the serverless function; after the computer-readable code has executed, modifying a pointer to an area of memory used to store a first state of the serverless function to reference a different area of memory; in response to a second request to run the serverless function, reusing, at the execution environment, the computer-readable code to perform the serverless function; and based on the pointer referencing the different area of memory, using the different area of memory to store a second state of the serverless function.

According to at least one example, a system for enabling reuse of execution environments and code for serverless functions while providing isolation in serverless computing environments is provided. The system can include one or more processors and at least one computer-readable storage medium having stored thereon instructions which, when executed by the one or more processors, cause the system to execute, at an execution environment on a network, computer-readable code configured to perform the serverless function, the computer-readable code being executed in response to a first request to run the serverless function; after the computer-readable code has executed, modify a pointer to an area of memory used to store a first state of the serverless function to reference a different area of memory; in response to a second request to run the serverless function, reuse, at the execution environment, the computer-readable code to perform the serverless function; and based on the pointer referencing the different area of memory, use the different area of memory to store a second state of the serverless function.

According to at least one example, a non-transitory computer-readable storage medium for enabling reuse of execution environments and code for serverless functions while providing isolation in serverless computing environments is provided. The non-transitory computer-readable storage medium can store instructions which, when executed by one or more processors, cause the one or more processors to execute, at an execution environment on a network, computer-readable code configured to perform the serverless function, the computer-readable code being executed in response to a first request to run the serverless function; after the computer-readable code has executed, modify a pointer to an area of memory used to store a first state of the serverless function to reference a different area of memory; in response to a second request to run the serverless function, reuse, at the execution environment, the computer-readable code to perform the serverless function; and based on the pointer referencing the different area of memory, use the different area of memory to store a second state of the serverless function.

In at least some aspects, the method, system, and non-transitory computer-readable storage medium described above can receive the first request to run the serverless function and deploy, at the execution environment, the computer-readable code configured to perform the serverless function.

In at least some aspects, the method, system, and non-transitory computer-readable storage medium described above can determine, in response to the second request, that the computer-readable code is loaded at the execution environment, and in response to determining that the computer-readable code is loaded at the execution environment, reuse the execution environment and the computer-readable code to process the second request.

In some examples, determining that the computer-readable code is loaded at the execution environment can include determining that the execution environment is available and capable of running the serverless function.

In some examples, the different area of memory can include an unused area of memory in an initialize state, and the execution environment can include a software container, a virtual machine, or a server.

In at least some aspects, the method, system, and non-transitory computer-readable storage medium described above can receive a third request to run the serverless function; prior to executing the serverless function in response to the third request, modify the pointer to reference a different unused area of memory; and after modifying the pointer to reference the different unused area of memory, execute the computer-readable code to perform the serverless function and using the different unused area of memory for a third state of the serverless function.

In at least some aspects, the method, system, and non-transitory computer-readable storage medium described above can identify the different area of memory and assign the different area of memory to the computer-readable code, the serverless function and/or the second state of the serverless function.

In at least some aspects, the method, system, and non-transitory computer-readable storage medium described above can provide a response to the first request. In some examples, the response can include an output of the serverless function, an output of the computer-readable code, and/or data associated with the serverless function.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

EXAMPLE EMBODIMENTS

Serverless computing can provide a computing execution model that allows developers and clients to build and/or use applications and outsource infrastructure and resource allocation responsibilities to a cloud provider. The underlying infrastructure used to run the applications is hosted and managed by the cloud provider. In function-as-a-service (FaaS) implementations, serverless computing is provided as a service for running code for a client. The client can upload the code to the cloud, and the cloud manages the resources for running the code. The cloud executes the code in response to an event configured to trigger the code. The client pays the cloud provider based on the compute time consumed by execution of the code. FaaS can thus simplify application deployment for users and developers.

In some examples, when an FaaS platform detects an event configured to trigger an FaaS function, the FaaS platform can instantiate an execution environment, such as a virtual machine or a software container, loaded with the code for the FaaS function, and execute the code at the execution environment. The execution environment is typically stateless and instantiated on demand. When the FaaS function has completed executing, the execution environment is undeployed or recycled. The ephemeral nature of such FaaS implementations can provide isolation and ensure that state associated with an FaaS function does not become tainted or modified in unexpected ways over time.

While isolation can provide desirable protections against undesired and/or unexpected modifications to function state, the stateless and ephemeral nature of such FaaS implementations can cause a penalty on performance, as execution environments and function code are not reused and rather instantiated each time an associated FaaS function is triggered. This results in frequent performance penalties since deploying and releasing execution environments can be time and computationally expensive. Moreover, the time lost in deploying and releasing execution environments can result in monetary losses for the cloud provider. For example, since clients are generally charged based on the compute time consumed by execution of the code, the time spent instantiating an execution environment before the code is executed and the time spent releasing an execution environment after the code is executed is not charged to the client, resulting in monetary losses for that uncharged time.

In some cases, to improve FaaS performance and reduce monetary losses, an execution environment loaded with FaaS code can be reused when the FaaS function is triggered more than once. However, while reusing execution environments can improve performance, it can also reduce isolation of FaaS components (e.g., code, state, execution environments, etc.), which creates performance risks and vulnerabilities. For example, if an FaaS function is loaded and executed repeatedly from the same execution environment without tearing down and reloading the execution environment, the runtime can become tainted (e.g., modified in undesirable and/or unexpected ways). Variables used by the code and execution environment can become tainted, and even the filesystem can be modified in undesirable and/or unexpected ways. This can result in an unpredictable starting position and/or state if the code and execution environment are reused, and may ultimately affect the function's behavior, performance, stability, etc. These problems can be particularly compounded when using dynamic languages where the code can be modified as it runs.

In some examples, the approaches disclosed herein can enable reuse of serverless components (e.g., execution environments, code, etc.) in serverless/FaaS platforms while providing isolation. By reusing serverless components such as execution environments and code, the approaches herein can provide significant performance benefits while reducing time and compute expenses associated with deploying and releasing execution environments each time a function is triggered. In addition, the approaches herein can provide complete isolation when reusing serverless components, thereby preventing or limiting unauthorized access, tainting or corruption of code and execution environments, and unexpected errors or behavior.

In some cases, an execution environment loaded with code can be reused to serve subsequent requests for a serverless function, rather than being deployed and released each time the serverless function is triggered. Before and/or after reusing the code and execution environment, memory associated with the code can be swapped out and refreshed. The memory can include a state of the function and/or any portion of function data used and/or modified by the function. By swapping out and refreshing the memory, the code and execution environment can be reused while ensuring isolation each time.

For example, in some cases, the code and state of a function can be stored in memory. While the code executes, the code can modify the state of the function. When the code finishes executing and/or before the code is executed again, a pointer to the state of the function in memory can be changed from a current location in memory to a different, unused location in memory. In some examples, the different location in memory can be an area of memory in an initialize ("init") state. This memory swap of function state can be performed before the function starts and/or after the function is executed. Moreover, the different memory location used each time the function runs can provide complete isolation, as previously explained.

Figure 2:
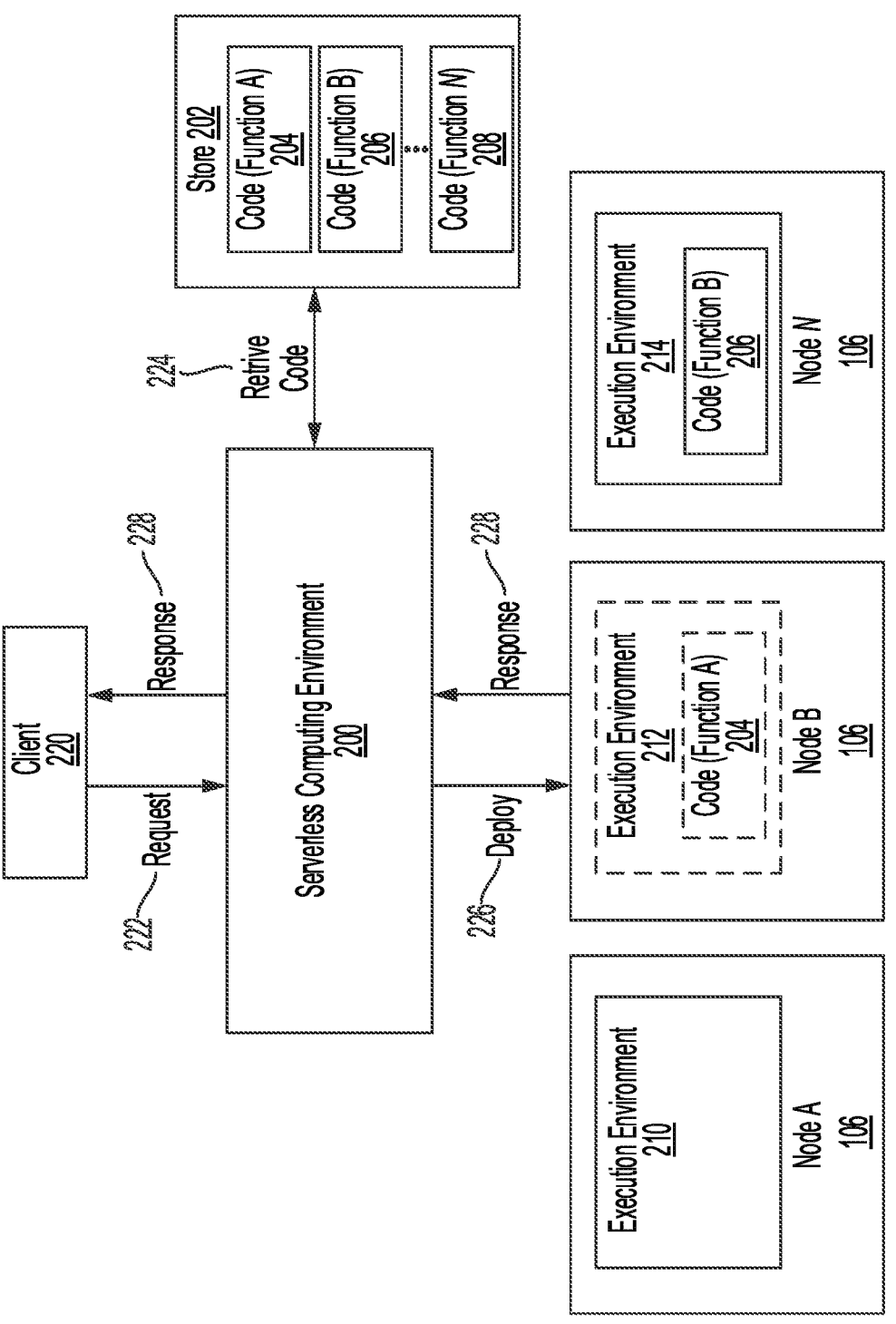
FIG. 2 is a block diagram illustrating an example serverless computing environment for implementing serverless functions and providing function-as-a-service (FaaS), in accordance with some examples.
Figure 3:
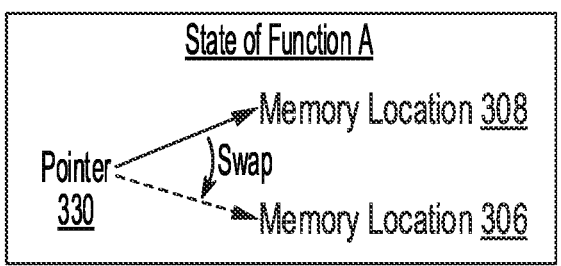
FIG. 3 is a block diagram illustrating an example of a previously-deployed execution environment and code reused to serve a request to execute a serverless function associated with the code, in accordance with some examples.
Figure 4:
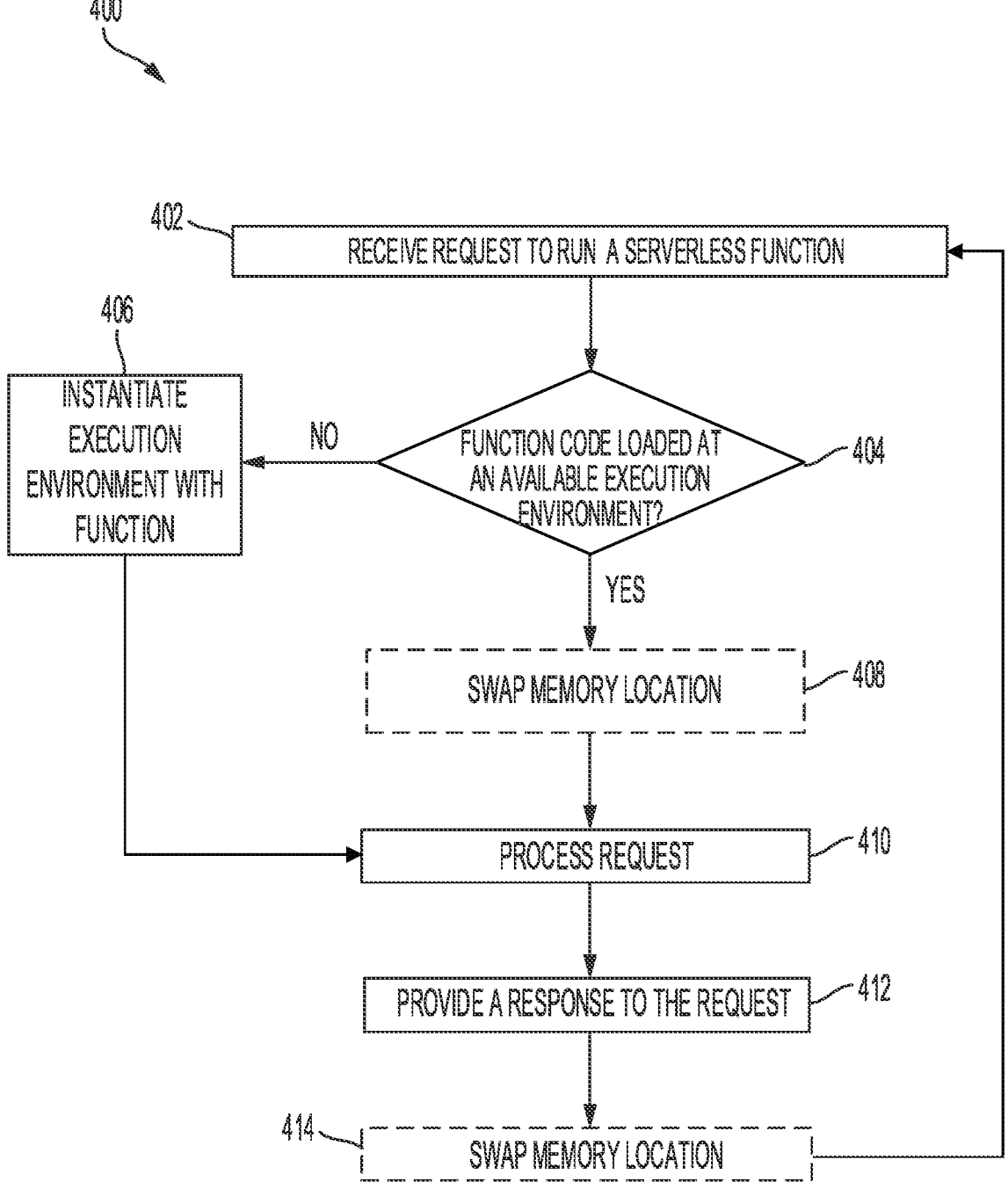
Figure 6:
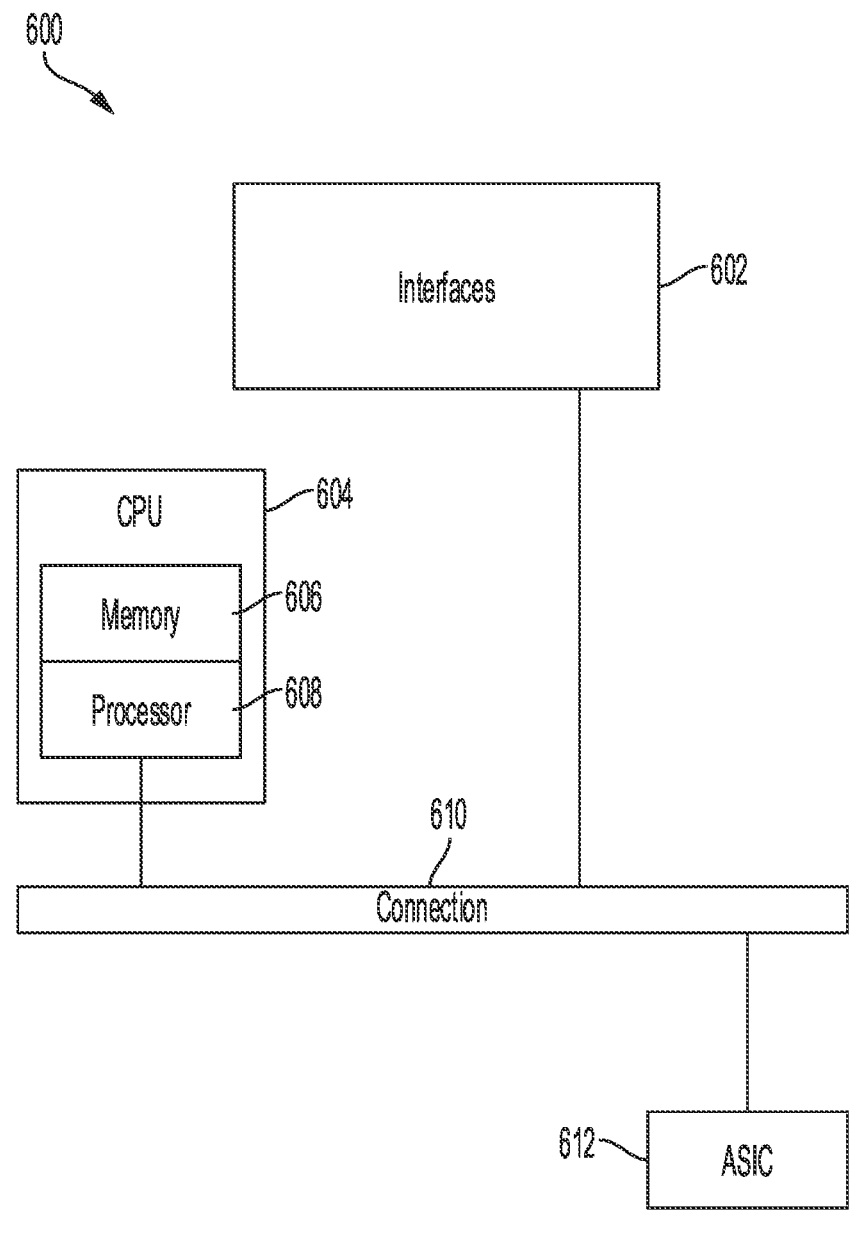
FIG. 6 illustrates an example network device in accordance with some examples.
Figure 7:
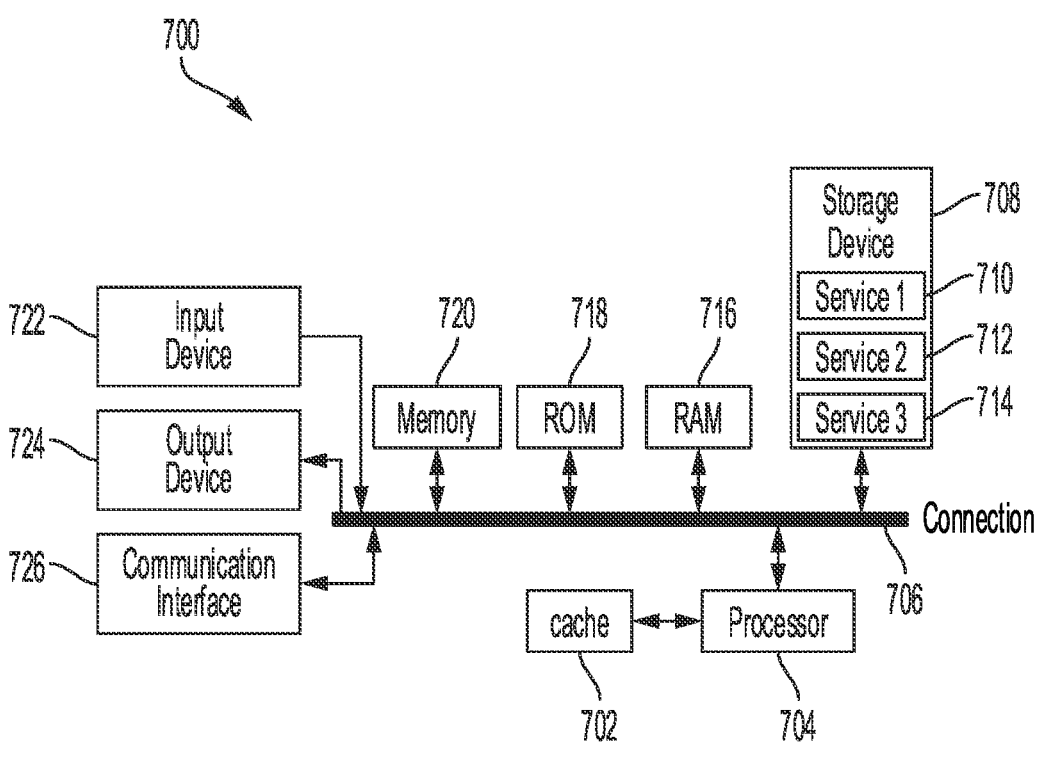
FIG. 7 illustrates an example computing device in accordance with some examples.

As further described below, the disclosed technology provides systems, methods, and computer-readable media for enabling reuse of execution environments while ensuring isolation in serverless computing environments, such as FaaS platforms. The present technology will be described in the subsequent disclosure as follows. The discussion begins with a description of example computing environments, systems, and techniques for enabling reuse of execution environments while ensuring isolation in serverless computing environments, as illustrated in FIGS. 1-3. A description of example methods for enabling reuse of execution environments while ensuring isolation in serverless computing environments, as illustrated in FIGS. 4 and 5, will then follow. The discussion concludes with a description of an example network device, as illustrated in FIG. 6, and an example computing device architecture including example hardware components suitable for performing serverless computing and FaaS operations, as illustrated in FIG. 7. The disclosure now turns to FIG. 1.

FIG. 1 is a block diagram illustrating an example network architecture 100, in accordance with some examples. In some examples, the network architecture 100 can include a network fabric 110. The network fabric 110 can include and/or represent the physical layer or infrastructure (e.g., underlay) of the network architecture 100. For example, in some cases, the network fabric 110 can represent a data center(s) of one or more networks such as, for example, one or more cloud networks. In this example architecture, the fabric 110 can include spine nodes 102 (e.g., spine switches or routers) and leaf nodes 104 (e.g., leaf switches or routers), which can be interconnected to route or switch traffic in the fabric 110.

The spine nodes 102 can interconnect with the leaf nodes 104 in the fabric 110, and the leaf nodes 104 can connect the fabric 110 to an external network(s), a network overlay(s) and/or logical portion(s) of the network. In some cases, the network overlay(s) and/or logical portion(s) of the network can include, for example, application services, servers, virtual machines, software containers, virtual resources (e.g., storage, memory, CPU, network interfaces, applications, execution environments, etc.), virtual networks, etc.

Network connectivity in the fabric 110 can flow from the spine nodes 102 to the leaf nodes 104, and vice versa. In some cases, the interconnections between the leaf nodes 104 and the spine nodes 102 can be redundant (e.g., multiple interconnections) to avoid a failure in routing. In some examples, the leaf nodes 104 and the spine nodes 102 can be fully connected, such that any given leaf node is connected to each of the spine nodes 102, and any given spine node is connected to each of the leaf nodes 104. Other interconnections between the leaf nodes 104 and the spine nodes 102 are also possible and contemplated herein.

In some cases, the leaf nodes 104 can be, for example, top-of-rack ("ToR") switches, aggregation switches, gateways, ingress and/or egress switches, provider edge devices, and/or any other type of routing or switching device. The leaf nodes 104 can route and/or bridge client/tenant/customer packets to and from other elements, as further described below. In some cases, the leaf nodes 104 can apply network policies or rules to packets. The leaf nodes 104 can connect other elements to the fabric 110. For example, the leaf nodes 104 can connect the server nodes 106, virtual nodes 108 (e.g., virtual machines (VMs), software containers, etc.), network device 120, etc., with the fabric 110. In some examples, one or more of such elements can reside in one or more logical or virtual layers or networks, such as an overlay network. In some cases, the leaf nodes 104 can encapsulate and decapsulate packets to and from such elements in order to enable communications throughout network architecture 100 and/or the fabric 110. The leaf nodes 104 can also provide any other devices, services, tenants, or workloads access to the fabric 110.

In some cases, the server nodes 106 connected to the leaf nodes 104 can encapsulate and decapsulate packets to and from the leaf nodes 104. For example, the server nodes 106 can include one or more virtual switches, routers tunnel endpoints, etc., for tunneling packets between an overlay or logical layer hosted by, or connected to, the server nodes 106 and an underlay layer represented by or included in the fabric 110 and accessed via the leaf nodes 104. The server nodes 106 can include, for example, computing devices, such as physical servers, network devices (e.g., switches, routers, etc.), storage devices, and the like. Moreover, the server nodes 106 can host virtual nodes 108 as further described herein.

In some cases, some or all of the virtual nodes 108 can include software containers, virtual machines, software applications, services, appliances, functions, service chains, etc. For example, one or more of the virtual nodes 108 can include a software container providing an execution environment, a storage service, a firewall service, a message router, a virtual switch, and/or any other application service. One or more applications can be hosted or implemented by one or more software containers corresponding to one or more of the virtual nodes 108 or can be distributed, chained, etc. In some cases, some or all of the virtual nodes 108 can include virtual machines (VMs). VMs can include workloads running on a guest operating system on a respective node. In some cases, a VM (e.g., 108) on a server node (e.g., 106) can be migrated to a different server node (e.g., 106).

In some cases, one or more server nodes 106 and/or virtual nodes 108 can represent or reside in one or more tenant or customer spaces. A tenant or customer space can include workloads, services, applications, devices, networks, networks or routing domains (e.g., virtual routing and forwarding (VRF) domains, bridge domains (BDs), subnets, virtual networks, etc.) and/or resources associated with one or more clients or subscribers. In some examples, traffic in the network architecture 100 can be routed based on specific tenant policies, agreements, configurations, etc. In some cases, addressing can vary between tenants. In some examples, tenant spaces can be divided into logical segments and/or networks and separated from logical segments and/or networks associated with other tenants.

Configurations in the network architecture 100 can be implemented at a logical level, a hardware level (e.g., physical), and/or both. For example, configurations can be implemented at a logical and/or hardware level based on connection attributes, endpoint or resource attributes, etc., such as endpoint types and/or application groups or profiles. In some examples, configurations can be implemented through a software-defined network (SDN), underlay framework and/or overlay framework. Such configurations can define rules, policies, priorities, protocols, attributes, objects, profiles, groups, traffic, security parameters, etc., for routing, processing, and/or classifying traffic in the network architecture 100. For example, configurations can define attributes and objects for classifying and processing traffic based on endpoint groups (EPGs), security groups (SGs), VM types, BDs, VRFs, tenants, priorities, firewall rules, labels, addresses, etc.

The network architecture 100 can deploy different resources (e.g., hosts, applications, services, functions, etc.) via the leaf nodes 104, the server nodes 106, the virtual nodes 108, and/or any other device. The network architecture 100 can interoperate with a variety of server nodes 106 (e.g., physical and/or virtual servers), orchestration platforms, systems, etc. In some cases, the network architecture 100 can implement and/or can be part of one or more cloud networks and can provide cloud computing services such as, for example, cloud storage, software-as-a-service (SaaS) (e.g., collaboration services, email services, enterprise resource planning services, content services, communication services, etc.), infrastructure-as-a-service (IaaS) (e.g., security services, networking services, systems management services, etc.), platform-as-a-service (PaaS) (e.g., web services, streaming services, application development services, etc.), function-as-a-service (FaaS), and/or any other types of services such as desktop-as-a-service (DaaS), information technology management-as-a-service (ITaaS), managed software-as-a-service (MSaaS), mobile backend-as-a-service (MBaaS), etc. In some examples, the network architecture 100 can implement and/or host a serverless computing environment(s), as further described below.

The network architecture 100 described above illustrates a non-limiting example network environment and architecture provided herein for explanation purposes. It should be noted that other network environments and architectures can be implemented in other examples and are also contemplated herein. One of ordinary skill in the art will recognize in view of the disclosure that the technologies and approaches herein can apply to a variety of different network environments and architectures.

FIG. 2 is a block diagram illustrating an example serverless computing environment 200. The serverless computing environment can include an FaaS platform to provide FaaS services to clients/customers. In some examples, the serverless computing environment 200 can be hosted on and/or implemented by the network architecture 100 shown in FIG. 1.

The serverless computing environment 200 can include a store 202 for storing code 204-208 associated with functions for FaaS and serverless computing. For example, the store 202 can store code 204 associated with function A, code 206 associated with function B, and code 208 associated with function N. The serverless computing environment 200 can include and/or deploy execution environments 210-214 for executing the code 204-208. In some examples, the serverless computing environment 200 can deploy and/or undeploy execution environments dynamically (e.g., on demand) and/or based on one or more orchestration strategies/factors, such as resource availability, quality-of-service (QoS) requirements, scheduling parameters, load balancing, etc. In some cases, the execution environments 210-214 can execute the code 204-208 in response to one or more events configured to trigger the functions associated with the code 204-208, such as a request, signal, trigger, etc.

The execution environments 210-214 can include, for example and without limitation, an execution runtime environment, an execution model, a runtime system, dependencies, resources, etc., for the code 204-208 to execute. In some examples, the execution environments 210-214 can include and/or can be implemented by virtual nodes 108. For example, the execution environments 210-214 can include and/or can be implemented by VMs, software containers, and the like. In some examples, the execution environments 210-214 can be implemented by one or more physical nodes, such as physical servers.

The serverless computing environment 200 can scale execution environments. For example, in some cases, if a function is needed (e.g., triggered, requested, etc.) and an execution environment has not been deployed for the function, an execution environment capable of executing the function is unavailable, and/or the code for the function has not been loaded on an execution environment, the serverless computing environment 200 can deploy the code for the function and/or the execution environment as needed (e.g., on demand, etc.). As further described herein, if an execution environment that was previously deployed and/or the code for a function loaded on the execution environment is/are needed, the serverless computing environment 200 can reuse the execution environment and/or the code for the function on the execution environment.

For example, in FIG. 2, the execution environment 214 was previously deployed and code 206 associated with function B was previously loaded on the execution environment 214. After the code 206 is executed, instead of undeploying the execution environment 214 and/or removing the code 206 from the execution environment 214, the serverless computing environment 200 can reuse the execution environment 214 and the code 206 on the execution environment 214 to serve future requests for function B associated with the code 206. To illustrate, the serverless computing environment 200 can deploy the execution environment 214 with the code 206 and execute the code 206 on demand (e.g., in real time or near real time), such as in response to a triggering event (e.g., a request to invoke function B associated with the code 206, a trigger, etc.). When the code 206 completes executing, the serverless computing environment 200 can retain the execution environment 214 and the code 206 loaded in the execution environment 214 for reuse to more quickly serve future requests for function B associated with the code 206. This can provide increased performance when handling requests for function B. As further described herein, when reusing the code 206, the serverless computing environment 200 can use a different memory or portion of memory to run the code 206 and/or store the associated state. This can provide isolation and greater stability when reusing code to execute a function.

As shown in the example illustrated in FIG. 2, the serverless computing environment 200 has received a request 222 from client 220 to execute function A associated with the code 204. In this example, an executing environment loaded with the code 204 has not been deployed and is not available at the time of the request 222. Accordingly, in response to the request 222, the serverless computing environment 200 can deploy 226 execution environment 212 for the code 204, retrieve 224 the code 204 from the store 202 and load the code 204 on the execution environment 212. In some cases, the serverless computing environment 200 can instantiate the execution environment 212 with the code 204 in response to the request 222. In some cases, if an execution environment capable of running the code 204 is available, the serverless computing environment 200 can load the code 204 on the existing execution environment rather than deploying a new execution environment.

When deploying 226 the execution environment 212 with the code 204, the serverless computing environment 200 can instantiate the execution environment 212 and load the code 204. The execution environment 212 can then execute the code 204 and generate a response 228 to the request 222. The response 228 can include an output and/or reply generated by the function A associated with the code 204 executed by the execution environment 212. The serverless computing environment 200 can provide the response 228 from the execution environment 212 to the client 220. In some examples, the client 220 can include an endpoint, another function, an application, and/or any computing node such as, for example and without limitation, a laptop computer, a desktop computer, a tablet computer, a smartphone, a server, a network device, a gaming console, a media device, a smart wearable device (e.g., a head-mounted display, a smart watch, smart glasses, etc.), an autonomous device (e.g., a robot, an unmanned aerial vehicle, an autonomous vehicle, etc.), an Internet-of-Things (IoT) device, etc.

In the previous example, while the code 204 executes, the code 204 can maintain, access and/or modify a state of the function A associated with the code 204, at a location in memory. After the code 204 executes, rather than undeploying or removing the execution environment 212 with the code 204, the serverless computing environment 200 can maintain the execution environment 212 loaded with the code 204 for future use. This can provide performance benefits as future requests for the function associated with the code 204 can be served without having to instantiate an execution environment for the request and/or load the code 204 for function A. To provide isolation, protect the function state (and the integrity of the function state), and prevent unauthorized data access, before the code 204 is executed again, a pointer to an area in memory where the state of function A is located/stored can be modified to point to a different memory and/or area in memory. The different memory and/or area in memory can be an unused memory and/or memory location. In some examples, the different memory and/or area in memory can be a memory and/or memory location that is in an initialize state.

When the code 204 is reused (e.g., executed again), the state of function A can run from the different memory and/or area in memory (e.g., the different memory and/or area in memory identified by the pointer). This way, the data memory (e.g., function state, etc.) can be refreshed each time the code 204 is executed to provide isolation of the data memory. Before (or if) the code 204 is reused yet again, the pointer can be modified to point to a different memory and/or area in memory.

FIG. 3 is a block diagram illustrating an example of a previously-deployed execution environment and code reused to serve a request to execute an FaaS function associated with the code. In this example, the execution environment 212 first receives a request 312 to execute a function (e.g., function A) associated with code 204 loaded on the execution environment 212. The request 312 can originate from a client 340A (e.g., a computing device, an application, a VM, a software container, a server, another function, etc.). For example, the client 340A can issue a call for the function associated with the code 204 to the serverless computing environment 200. The call can be routed to the execution environment 212 to trigger execution of the code 204.

When the execution environment 212 receives the request 312, an executor 302 at the execution environment 212 can execute 314 the code 204 associated with the requested function. The executor 302 can represent the execution environment 212 or a component associated with the execution environment 212, such as a process, an interface, an application, a software container, a VM, a function, a processor, a handler, an operating system, a computing resource, and the like. In the example shown in FIG. 3, the execution environment 212 was instantiated and loaded with the code 204 prior to the request 312. For example, the execution environment 212 may have been previously instantiated and loaded with the code 204 in response to a triggering event, such as a previous request, and left for reuse to serve a future request, such as request 312. The execution environment 212 was not undeployed after the code 204 was previously executed and instead maintained loaded with the code 204. Accordingly, the executor 302 can reuse the execution environment 212 and the code 204 to serve the request 312 without having instantiate the execution environment 212 or load the code 204 on demand (e.g., in response to the request 312).

The executor 302 can access and execute the code 204 from memory or storage. When and/or while the code 204 executes, the code 204 associated with the function can save, access, and/or modify a state 316 of the function in memory 304. The state 316 of the function associated with the code 204 can reside in (and can be accessed from) a memory location 308 identified in a pointer 330. In some examples, the pointer 330 can specify an address or location in memory (e.g., location 308) for the state 316 of the function.

When the function associated with the code 204 has finished executing, the execution environment 212 can provide a response 318 to the client 340A. The response 318 can include a result, output, and/or any other data from the execution of the function associated with the code 204. Rather than removing or undeploying the execution environment 212 and/or the code 204, the serverless computing environment 200 can maintain the execution environment 212 loaded with the code 204 for future use. The execution environment 212 and the code 204 on the execution environment 212 can be reused for future requests. The reuse of the execution environment 212 loaded with the code 204 can provide better performance when serving requests for the function than otherwise instantiating the execution environment 212 and loading the code 204 on demand each time the function is triggered.

To provide isolation of the function state and added security, after the code 204 completes executing or before the code 204 is executed again, the pointer 330 to the memory location 308 where the state 316 of the function was maintained, can be set to a different location in memory, such as an unused location in memory. For example, the pointer 330 can be set from memory location 308 to memory location 306. Thus, before the code 204 is executed again, the memory associated with the state of the function can be swapped and refreshed to run a future state of the function from a different, unused location in memory (e.g., memory location 306 identified by the modified pointer 330). When the code 204 is executed again, the different memory location identified by the modified pointer can be used for the state of the function.

For example, client 340B can generate a different request 320 to run the function associated with the code 204. The execution environment 212 is already loaded with the code 204. When the execution environment 212 receives the different request 320 to run the function associated with the code 204, the executor 302 can execute 322 the code 204 to run the requested function. When the code 204 executes and/or while the code 204 executes, the code 204 can save, access, and/or modify a state 324 of the function associated with the code 204 and located in the memory location 306. The memory location 306 for the state 324 of the function can identified by the pointer 330. In some examples, the pointer 330 can specify an address associated with the memory location 306 for the state 324 of the function. The state 324 can be different/separate from the state 316. For example, the state 324 can be new state data generated when the code 204 is invoked/executed.

When the function associated with the code 204 has finished executing, the execution environment 212 can provide a response 326 to the client 340B. In some examples, rather than removing or undeploying the execution environment 212 and/or the code 204, the serverless computing environment 200 can again maintain the execution environment 212 loaded with the code 204 for future use. If the serverless computing environment 200 later determines that the code 204 and/or the execution environment 212 are no longer needed, the serverless computing environment 200 can unload the code 204 and/or undeploy or remove the execution environment 212.

For example, the serverless computing environment 200 can determine that a frequency of use of the execution environment 212 and/or the code 204 is below a threshold and, in response, unload the code 204 and/or undeploy the execution environment 212. As another example, the serverless computing environment 200 can unload the code 204 and/or undeploy the execution environment 212 based on network conditions (e.g., resource availability, network performance, etc.) and/or a frequency of use of the code 204 and/or the execution environment 212 relative to other code and/or execution environments. In some examples, the serverless computing environment 200 can monitor execution environments and/or use of code and/or execution environments deployed and determine whether to reuse execution environments and/or code or to undeploy execution environments and/or code based on monitoring data (e.g., frequency of use, performance, resource use and/or availability, etc.) and/or one or more other factors such as, for example, load balancing parameters, priorities, schedules, QoS parameters, etc.

In some cases, the execution environment 212 can run multiple instances of a serverless function simultaneously while providing isolation by using different memory locations for the respective states of the multiple instances of the serverless functions. For example, the execution environment 212 can assign different memory locations to the different instances of the serverless function. The execution environment 212 can implement protections to ensure that the portion of code running a first instance of the serverless function cannot write to the memory location used for a second instance of the serverless function, and the portion of code running the second instance of the serverless function cannot write to the memory location used by the portion of code running the first instance of the serverless function. In some examples, multiple copies of the serverless function can be instantiated inside a same process with different memory locations for each copy. The memory protections implemented for preventing code running an instance of a serverless from writing to a memory location that is not assigned to that instance of the serverless function, can allow the execution environment to run different instances of the serverless function simultaneously while maintaining isolation.

Having disclosed example systems, components and concepts, the disclosure now turns to the example methods 400 and 500 for reusing execution environments and serverless functions while ensuring isolation in serverless computing environments, as shown in FIGS. 4 and 5. The steps outlined herein are non-limiting examples provided for illustration purposes, and can be implemented in any combination thereof, including combinations that exclude, add, or modify certain steps.

FIG. 4 is a flowchart illustrating an example method 400 for reusing execution environments and serverless functions while ensuring isolation in a serverless computing environment. At block 402, the method 400 can include receiving (e.g., by serverless computing environment 200) a request to run a serverless function (e.g., Function A associated with code 204, Function B associated with code 206, or Function N associated with code 208). In some examples, a client (e.g., client 220) can send a request or call for a serverless function and/or a serverless function's endpoint. The serverless function can be associated with code available at (e.g., stored at, uploaded to, etc.) the serverless computing environment 200 for running the serverless function. The serverless computing environment 200 can receive the request or call from the client as process the request or call as further described herein.

At block 404, the method 400 can include determining (e.g., by the serverless computing environment 200) whether code (e.g., code 204, code 206, or code 208) for running the serverless function is loaded at an execution environment (e.g., execution environment 210, execution environment 212, or execution environment 214). In some cases, determining whether code for the serverless function is loaded at an execution environment can include determining whether an execution environment for executing the serverless function is available or needs to be instantiated (and/or loaded with the code) for the request.

For example, the serverless computing environment 200 can receive the request to run the serverless function and check if an execution environment capable of executing the code for the serverless function is available (e.g., has been instantiated/deployed) and loaded with the code. In some examples, the serverless computing environment 200 can identify the code associated with the serverless function and determine whether the code is loaded in an execution environment. The serverless computing environment 200 can identify the code and/or determine whether the code is loaded in an execution environment based on, for example and without limitation, the request (e.g., information in the request, an address associated with the request, etc.), information identifying the function, a pointer to the code associated with the function (and/or associated with the request), a mapping between the requested function and the code, and/or any other information for correlating the function and the code and/or identifying the code associated with the function.

At block 406, if an execution environment loaded with the code for the serverless function is not already deployed and/or available, the method 400 can include instantiating (e.g., by the serverless computing environment 200) an execution environment (e.g., execution environment 212) loaded with the code (e.g., code 204) for the serverless function (e.g., Function A). The method 400 can then proceed to block 410 to process the request.

On the other hand, at block 408, if an execution environment loaded (e.g., execution environment 212) with the code (e.g., code 204) for the serverless function is already deployed and/or available, the method 400 can include swapping (e.g., changing) a memory location (e.g., memory location 306, 308, or 310) for a state (e.g., state 316 or 324) of the serverless function. In some examples, the serverless computing environment 200 (or the execution environment in the serverless computing environment 200) can determine that the execution environment was previously instantiated and loaded with the code for the serverless function to run the serverless function in response to a previous triggering event (e.g., a previous request, etc.). The serverless computing environment 200 (or the execution environment) can swap the memory location for the state to avoid using the same memory location previously used for the state of the serverless function. By swapping the memory location, the serverless computing environment 200 (or the execution environment) can provide isolation when reusing the code to run the serverless function.

For example, the serverless computing environment 200 (or the execution environment in the serverless computing environment 200) can change the memory location to be used for the state of the serverless function when the serverless function is executed for the request. The swapped memory location can be a different memory location used for the state of the serverless function when the serverless function was previously executed for a different request. This way, the memory location used for the state of the serverless function executed for the request is not the same as the memory location previously used for the state of the serverless function when executed for the different request. The serverless computing environment 200 (or the execution environment) can swap the memory location (e.g., can change the memory location from a previous location to a different location) for the state of the serverless function each time the code associated with the serverless function is reused to run the serverless function. In some examples, the serverless computing environment 200 (or the execution environment) can swap the memory location before the code is executed (e.g., at block 408) and/or after the code is executed (e.g., at block 414).

In some examples, the new or different memory location for the state of the serverless function can be an unused memory location. In some cases, the memory location for the state of the serverless function can be swapped by setting a pointer (e.g., pointer 330) from a current memory location to a different memory location. For example, a pointer referencing the memory location to be used for the state of the serverless function can be modified so it points to a different location than a current location referenced by the pointer. The pointer can be used to identify the memory location for the state of the serverless function and can be changed each time (or as desired) the serverless function is executed for a different request or job.

At block 410, the method 400 can include processing (e.g., by the execution environment in the serverless computing environment) the request to run the serverless function. Processing the request to run the serverless function can include executing the code to run the serverless function. For example, the execution environment can execute the code and run the serverless function. The memory location used for the state of the serverless function can be determined based on a pointer, as previously explained. While the code executes, the code can create, access and/or modify the state of the serverless function. The state can be stored at the memory location identified by the pointer.

At block 412, the method 400 can include providing a response to the request. The response can include an output generated by the serverless function. For example, after running the serverless function, the execution environment can obtain an output from the serverless function and send a response to the client based on the output from the serverless function. In some cases, the method 400 can then optionally return to block 402 when a new request for the serverless function is received. In other cases, the method 400 can optionally continue to block 414.

As previously explained, the memory location for the state of the serverless function can be swapped before executing the code associated with the serverless function and/or after execution of the code associated with the serverless function is complete. Thus, in some cases, at block 414, the method 400 can optionally include swapping the memory location for the state of the serverless function as described above with respect to block 408. The method 400 can then return to block 402 when a new request for the serverless function is received. In some cases, the serverless computing environment 200 can maintain the execution environment loaded with the code until the execution environment and/or the code is no longer needed.

FIG. 5 is a flowchart illustrating another example method 500 for reusing execution environments and serverless functions while ensuring isolation. At block 502, the method 500 can include receiving (e.g., by serverless computing environment 200) a first request to run a serverless function (e.g., Function A associated with code 204).

At block 504, the method 500 can include deploying, at an execution environment (e.g., execution environment 212) in a serverless computing environment (e.g., serverless computing environment 200), computer-readable code (e.g., code 204) configured to perform the serverless function. In some examples, the serverless computing environment can deploy the computer-readable code at the execution environment in response to the first request. Moreover, in some cases, deploying the computer-readable code can include instantiating the execution environment and loading the execution environment with the computer-readable code. In some examples, the execution environment can include a software container, a virtual machine, a server, a runtime environment, an operating system, and/or the like.

At block 506, the method 500 can include executing, at the execution environment, the computer-readable code configured to perform the serverless function. In some examples, the code can run the serverless function and store/run a state (e.g., state 316) of the serverless function in a location in memory (e.g., memory location 308) while the computer-readable code executes. In some examples, the code can use a memory location identified based on a pointer referencing the memory location to be used for the state.

At block 508, the method 500 can include, after the computer-readable code has executed, modifying a pointer (e.g., pointer 330) to an area of memory (e.g., memory location 308) used to store a first state (e.g., state 316) of the serverless function to reference a different area of memory (e.g., memory location 306). In some examples, the different area of memory can include an unused area of memory that is different from the area of memory used prior to modifying the pointer. In some cases, the unused area of memory can be in an initialize state.

In some aspects, the method 500 can include identifying the different area of memory and assigning the different area of memory to the computer-readable code, the serverless function and/or future state of the serverless function. Moreover, the method 500 can include providing a response to the first request based on the execution of the serverless function.

At block 510, the method 500 can include, in response to a second request to run the serverless function, reusing, at the execution environment, the computer-readable code to perform the serverless function. For example, the execution environment can receive a second request to run the serverless function. The execution environment can then execute the computer-readable code to run the serverless function.

The computer-readable code can use the pointer previously modified to identify the area of memory for the state of the serverless function.

The modified pointer can identify the different area of memory, as previously explained. Thus, the area of memory used for the state of the serverless function executed in response to the second request at block 510, can be different than the area of memory used for the state of the serverless function executed at block 506 based on the first request.

At block 512, the method 500 can include, based on the pointer referencing the different area of memory, using the different area of memory to store a second state (e.g., state 324) of the serverless function. For example, the execution environment can identify the different area of memory referenced by the pointer and use the different area of memory (e.g., 306) for the function state when reusing the computer-readable code (e.g., code 204) to run the serverless function. In some aspects, the method 500 can include providing, after the computer-readable code has executed, a response to the second request. In some examples, the response can include an output of the serverless function, an output of the computer-readable code, and/or data associated with the serverless function.

In some aspects, the method 500 can include, in response to the second request, determining that the computer-readable code is loaded at the execution environment, and in response to determining that the computer-readable code is loaded at the execution environment, reusing the execution environment and the computer-readable code to process the second request (e.g., to run the serverless function). In some examples, determining that the computer-readable code is loaded at the execution environment can include determining that the execution environment is available and capable of running the serverless function.

In some aspects, the method 500 can include receiving a third request to run the serverless function; prior to running the serverless function in response to the third request, modifying the pointer to reference another different area of memory, such as a different unused area of memory; and, after modifying the pointer to reference the other different area of memory, executing (e.g., by the execution environment) the computer-readable code to perform the serverless function and using the other different area of memory for a third state of the serverless function.

The disclosure now turns to FIGS. 6 and 7, which illustrate example network devices and computing devices, such as switches, routers, nodes, servers, client devices, orchestrators, and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU (e.g., 604) to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates an example computing system architecture of a system 700 which can be used to process FaaS operations and requests, deploying execution environments, loading code associated with FaaS functions, and perform any other computing operations described herein. In this example, the components of the system 700 are in electrical communication with each other using a connection 706, such as a bus. The system 700 includes a processing unit (CPU or processor) 704 and a connection 706 that couples various system components including a memory 720, such as read only memory (ROM) 718 and random access memory (RAM) 716, to the processor 704.

The system 700 can include a cache of high-speed memory connected directly with, in close proximity to, or integrated as part of the processor 704. The system 700 can copy data from the memory 720 and/or the storage device 708 to cache 702 for quick access by the processor 704. In this way, the cache can provide a performance boost that avoids processor 704 delays while waiting for data. These and other modules can control or be configured to control the processor 704 to perform various actions. Other memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

The storage device 708 can include services 710, 712, 714 for controlling the processor 704. Other hardware or software modules are contemplated. The storage device 708 can be connected to the connection 706. In one aspect, a hardware module that performs a particular function can include the software component stored in a computer-readable medium in connection with the necessary hardware components, such as the processor 704, connection 706, output device 724, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving, by a serverless computing environment, a request to execute a serverless function;
in a reused execution environment with code loaded for executing the serverless function, swapping a memory location from a previous memory location to store a state of the serverless function; and
providing a response to the request.

2. The method of claim 1, wherein the swapping provides isolation when reusing the code to run the serverless function.

3. The method of claim 1, wherein the swapped memory location is a different memory location used for the state of the serverless function when the serverless function was previously executed for a different request.

4. The method of claim 1, wherein the response to the request includes output generated from execution of the serverless function.

5. The method of claim 1, wherein the memory location is an unused memory location.

6. The method of claim 1, wherein the swapping of the memory location includes changing a pointer reference.

7. The method of claim 1, further comprising:
determining whether the code for executing the serverless function is loaded in the execution environment; and
in response to the code for executing the serverless function not being loaded in the execution environment, instantiating the execution environment with the code.

8. A system comprising:
one or more processors; and
at least one computer-readable storage medium having stored thereon instructions which, when executed by the one or more processors, cause the one or more processors to:
receive a request to execute a serverless function;
in a reused execution environment with code loaded for executing the serverless function, swap a memory location from a previous memory location to store a state of the serverless function; and
provide a response to the request.

9. The system of claim 8, wherein the swapping provides isolation when reusing the code to run the serverless function.

10. The system of claim 8, wherein the swapped memory location is a different memory location used for the state of the serverless function when the serverless function was previously executed for a different request.

11. The system of claim 8, wherein the response to the request includes output generated from execution of the serverless function.

12. The system of claim 8, wherein the memory location is an unused memory location.

13. The system of claim 8, wherein the swapping of the memory location includes changing a pointer reference.

14. The system of claim 8, comprising further instructions, which when executed by the one or more processors, cause the one or more processors to:
determine whether the code for executing the serverless function is loaded in the execution environment; and
in response to the code for executing the serverless function not being loaded in the execution environment, instantiate the execution environment with the code.

15. A non-transitory computer-readable storage medium having stored thereon instructions which, when executed by one or more processors, cause the one or more processors to:
receive a request to execute a serverless function;
in a reused execution environment with code loaded for executing the serverless function, swapping a memory location from a previous memory location to store a state of the serverless function; and
provide a response to the request.

16. The non-transitory computer-readable storage medium of claim 15, wherein the swapping provides isolation when reusing the code to run the serverless function.

17. The non-transitory computer-readable storage medium of claim 15, wherein the swapped memory location is a different memory location used for the state of the serverless function when the serverless function was previously executed for a different request.

18. The non-transitory computer-readable storage medium of claim 15, wherein the response to the request includes output generated from execution of the serverless function.

19. The non-transitory computer-readable storage medium of claim 15, wherein the memory location is an unused memory location.

20. The non-transitory computer-readable storage medium of claim 15, wherein the swapping of the memory location includes changing a pointer reference.

* * * * *